(12) United States Patent
Wang et al.

(10) Patent No.: US 12,444,748 B2
(45) Date of Patent: Oct. 14, 2025

(54) BATTERY CELL, BATTERY THAT USES THE SAME AND ELECTRONIC DEVICE

(71) Applicant: Ningde Amperex Technology Limited, Ningde (CN)

(72) Inventors: Pan Wang, Ningde (CN); Tingling Lei, Ningde (CN); Hai Long, Ningde (CN); Huijun Liu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 882 days.

(21) Appl. No.: 17/281,383

(22) PCT Filed: May 20, 2020

(86) PCT No.: PCT/CN2020/091384
§ 371 (c)(1),
(2) Date: Mar. 30, 2021

(87) PCT Pub. No.: WO2021/232312
PCT Pub. Date: Nov. 25, 2021

(65) Prior Publication Data
US 2022/0123313 A1    Apr. 21, 2022

(51) Int. Cl.
*H01M 4/62* (2006.01)
*H01M 10/0587* (2010.01)

(52) U.S. Cl.
CPC ......... *H01M 4/62* (2013.01); *H01M 10/0587* (2013.01)

(58) Field of Classification Search
CPC ....... H01M 4/62; H01M 10/0587; H01M 4/06
(Continued)

(56) References Cited

U.S. PATENT DOCUMENTS

2008/0254355 A1* 10/2008 Muraoka ............. H01M 10/058
429/129
2010/0233525 A1* 9/2010 Kaiduka ............... H01M 50/46
429/164
(Continued)

FOREIGN PATENT DOCUMENTS

CN    101150183 A    3/2008
CN    101286576 A    10/2008
(Continued)

OTHER PUBLICATIONS

International Search Report and Written Opinion issued on Feb. 20, 2021 in corresponding International Application No. PCT/CN2020/091384; 8 pages.
(Continued)

*Primary Examiner* — Niki Bakhtiari
*Assistant Examiner* — Omar M Kekia
(74) *Attorney, Agent, or Firm* — Maier & Maier, PLLC (57) ABSTRACT

A battery cell includes a first electrode plate, a second electrode plate, and an insulating adhesive. The first electrode plate includes a first current collector, a first coating, and a first active layer, the first coating is disposed between the first current collector and the first active layer and includes a thermal expansion material. The first electrode plate and the second electrode plate are wound at intervals, the first electrode plate is the outermost electrode plate of the battery cell and further includes a first end which is a winding ending end, a surface of the first current collector at the first end facing toward the center of the battery cell is provided with the first active layer. The insulating adhesive includes a first sub-insulating adhesive disposed on a surface of the first current collector on the outermost side of the battery cell facing away from the first active layer.

11 Claims, 8 Drawing Sheets

(58) Field of Classification Search
USPC .......................................................... 429/246
See application file for complete search history.

(56) References Cited

U.S. PATENT DOCUMENTS

| | | | |
|---|---|---|---|
| 2013/0029211 | A1 | 1/2013 | Seong et al. |
| 2015/0171383 | A1* | 6/2015 | Ahn .................... H01M 50/434 |
| | | | 428/354 |
| 2020/0144595 | A1 | 5/2020 | Lin |

FOREIGN PATENT DOCUMENTS

| | | |
|---|---|---|
| CN | 205882096 U | 1/2017 |
| CN | 106654165 A | 5/2017 |
| CN | 207781748 U | 8/2018 |
| CN | 109244475 A | 1/2019 |
| CN | 109309192 A | 2/2019 |
| CN | 109449478 A | 3/2019 |
| CN | 109728349 A | 5/2019 |
| CN | 109755461 A | 5/2019 |
| CN | 209045679 U | 6/2019 |
| CN | 110148706 A | 8/2019 |
| CN | 110808377 A | 2/2020 |
| JP | 200386233 A | 3/2003 |
| JP | 2012238512 A | 12/2012 |
| JP | 2018-137192 A | 8/2018 |
| KR | 1020040058918 A | 7/2004 |
| KR | 1020080092281 A | 10/2008 |
| WO | 2011062065 A1 | 5/2011 |
| WO | 2019189866 A1 | 10/2019 |

OTHER PUBLICATIONS

Office Action issued on May 5, 2022, in corresponding Chinese Application No. 202080005780.2, 16 pages.
Office Action issued on Sep. 23, 2022, in corresponding Chinese Application No. 202080005780.2, 12 pages.
Office Action issued on Mar. 18, 2023, in corresponding Chinese Application No. 202080005780.2, 14 pages.
Examination Report issued on Dec. 30, 2022, in corresponding Indian Application No. 202117015363, 9 pages.
Office Action issued on Sep. 13, 2022, in corresponding Japanese Application No. 2021-517415, 9 pages.
Decision to Grant a Patent issued on Apr. 4, 2023, in corresponding Japanese Application No. 2021-517415, 6 pages.
Request for the Submission of an Opinion issued on Apr. 7, 2023, in corresponding Korean Application No. 10-2021-7009052, 15 pages.
Written Decision on Registration issued on Sep. 19, 2023, in corresponding Korean Application No. 10-2021-7009052, 6 pages.
Extended European Search Report issued on Oct. 14, 2021, in corresponding European Application No. 20866914.3, 9 pages.

* cited by examiner

BATTERY CELL, BATTERY THAT USES THE SAME AND ELECTRONIC DEVICE

TECHNICAL FIELD

This application relates to the field of energy storage technologies, and in particular, to a battery cell, a battery that uses the battery cell and an electronic device.

BACKGROUND

In the prior art, in a wound battery, generally, there is a part of uncovered aluminum foil (that is, the two surfaces of the foil are not coated with an active material) at the tail of the outer layer of a battery cell. A green adhesive is generally attached to the uncovered aluminum foil and the edge of the coating at the tail of the battery cell, thus reducing a risk of a short circuit caused by lithium dendrites at the edge of an anode coating. However, the excess uncovered aluminum foil at the tail of the battery cell and the green adhesive at the edge of the tail coating occupy a certain volume of the battery cell, which reduces the energy density of the battery cell. On the other hand, in a needling test of a lithium ion battery, a damaged edge of a cathode aluminum foil is subjected to the extrusion of a steel needle row during the needle passes through the cathode to the anode, and is easily in contact with the anode, and causes a short-circuit, thereby resulting in a rapid rise in a heat generation rate much greater than a heat dissipation rate. When the heat is accumulated, it directly leads to a high risk of thermal runaway or fire. At the same time, when such battery cells are hit by heavy objects, an aluminum plastic film housing generally does not break or breaks incompletely due to its better ductility, but the battery cell itself breaks, the debris formed by the breaking, especially debris generated by the uncovered aluminum foil of an outer ring which is wrapped and bound by the housing, contact with broken electrode plates of the battery cell, thus resulting in short circuit, heating and even events such as fire explosion.

How to provide a new battery cell structure to solve the above problems is to be taken into account by those skilled in the art.

SUMMARY

In order to solve the problems in the prior art that the uncovered aluminum foil at the tail of the battery cell occupying the volume of the battery cell reduces energy density of the battery cell, anode ending may increase the risk of a short circuit of the battery cell, and the occurrence of a short circuit is easy to cause thermal runaway and fire.

An embodiment of this application provides a battery cell, including a first electrode plate, a second electrode plate, and an insulating adhesive. The first electrode plate includes a first current collector, a first coating, and a first active layer, the first coating is disposed between the first current collector and the first active layer, and the first coating comprises a thermal expansion material. The first electrode plate and the second electrode plate are wound at intervals, the outermost electrode plate of the battery cell is provided as the first electrode plate, the first electrode plate further includes a first end, the first end is a winding ending, and a surface of the first current collector which is located at the first end facing toward the center of the battery cell is provided with the first active layer. The insulating adhesive includes a first sub-insulating adhesive, the first sub-insulating adhesive is disposed on a surface of the first current collector of the outermost side of the battery cell facing away from the first active layer. An embodiment of this application further provides a battery that uses the battery cell and an electronic device.

In one embodiment, the first coating is selected from one of polyvinylidene fluoride, a copolymer of vinylidene fluoride-hexafluoropropylene, polyamide, polyacrylonitrile, polyacrylate, polyacrylic acid, sodium carboxymethyl cellulose, polyvinyl pyrollidonone, polyethylene ether, polymethyl methacrylate, polytetrafluoroethylene, polyhexafluoropropylene and styrene butadiene rubber and combinations thereof.

In one embodiment, the second electrode plate includes a second current collector and a second active layer, the second electrode plate includes a second end, the battery cell includes a first end face and a first arc-surface region connected to the first end face, the first end is disposed in the first arc-surface region and a length of the first electrode plate located on the first arc-surface region is less than one half of an arc length of the first arc-surface region, the second end is disposed in the first arc-surface region and a length of the second electrode plate located on the first arc-surface region is less than one half of the arc length of the first arc-surface region, a surface of the second current collector located at the second end is provided with the second active layer, and a distance from the first end to the first end face is greater than a distance from the second end to the first end face.

In one embodiment, the insulating adhesive further includes a second sub-insulating adhesive that covers the first end and the second end, the second sub-insulating adhesive is in contact with the first sub-insulating adhesive.

In one embodiment, the battery cell further includes a separator disposed between the first electrode plate and the second electrode plate, and a distance from one end of the separator to the first end face is less than the distance from the second end to the first end face.

In one embodiment, the first electrode plate further includes a third end, the second electrode plate further includes a fourth end, the third end and the fourth end are winding starting ends, and the battery cell further includes tabs disposed at the third end and the fourth end.

In one embodiment, a surface of the first current collector located at the third end is not provided with the first active layer, a surface located at the fourth end is not provided with the second active layer, the insulating adhesive further comprises a third sub-insulating adhesive and a fourth sub-insulating adhesive, the surface of the first current collector located at the third end is provided with the third sub-insulating adhesive, the third sub-insulating adhesive is provided with a connecting region, each tab disposed at the third end is at least partially disposed in the connecting region, and the fourth sub-insulating adhesive is symmetrically disposed on two sides of the connecting region.

In one embodiment, the battery cell further includes tabs, the first electrode plate includes a first uncovered foil region, the second electrode plate includes a second uncovered foil region, the first current collector located in the first uncovered foil region is not covered by the first active layer, the second current collector located in the second uncovered foil region is not covered by the second active layer, and the tabs are disposed in the first uncovered foil region and the second uncovered foil region.

A battery includes the battery cell described above.

An electronic device includes the battery described above.

Compared with the prior art, in the battery cell according to this application, the outermost electrode plate of the battery cell is ended with a first current collector provided with an active layer on single side, which is designed with no uncovered foil region, thus reducing the consumption of consumable materials while improving the energy density of the lithium ion battery. An uncovered foil surface of the first current collector provided with an active layer on single side on the outermost side of the battery cell is provided with a first sub-insulating adhesive, which can avoid a short-circuit of the battery cell caused by contacting with the outside, thereby improving the safety performance of the battery cell. A first coating is provided between the first current collector and the first active layer, so that when a short circuit occurs, the first coating can rapidly expand to separate the first current collector from other contacts, avoiding violent thermal runaway.

REFERENCE NUMERALS

Electronic device 100
Body 105
Battery 1
Battery cell 10, 20, 30
First electrode plate 11, 21
First current collector 110, 210
First active layer 119, 219
First coating 115, 215
Top sealing region 116
First uncovered foil region 218
First end 111, 211
Third end 113, 213
Connecting region 117
Second electrode plate 12, 22
Second current collector 120, 220
Second active layer 129, 229
Second uncovered foil region 228
Second end 122, 222
Fourth end 124, 224
Separator 13, 23
Fifth end 135, 235
Sixth end 136, 236
Insulating adhesive 15, 25
First sub-insulating adhesive 151, 251
Second sub-insulating adhesive 152, 252
Third sub-insulating adhesive 153
Fourth sub-insulating adhesive 154
Sixth sub-insulating adhesive 256
Seventh sub-insulating adhesive 257
Tab 16, 26
First tab 17, 27
Second tab 18, 28
First end face 101, 201
First arc-surface region 102, 202

This application is further described below with reference to the following specific embodiments and the foregoing drawings.

DETAILED DESCRIPTION OF EMBODIMENTS

The following describes content of this application more fully below with reference to the drawings. Exemplary embodiments of this application are shown in the drawings. However, this application may be implemented in many different forms and should not be construed as being limited to the exemplary embodiments set forth herein. The exemplary embodiments are provided in order to make this application thorough and complete and to fully communicate the scope of this application to those skilled in the field. Similar reference numerals indicate the same or similar components.

The terms used herein are intended only to describe particular exemplary embodiments but not to limit this application. As used herein, singular forms "a/an", "one", and "the" are intended to include plural forms as well, unless the context clearly indicates otherwise. In addition, when used herein, "comprising" and/or "including " or "comprising" and/or "including" or "having" and/or "having" specify the presence of integers, steps, operations, elements, and/or components, but do not preclude the presence or addition of one or more other features, regions, integers, steps, operations, elements, components, and/or groups thereof.

Unless defined otherwise, all terms (including technical and scientific terms) used herein have the same meanings as are commonly understood by those of ordinary skill in the art. In addition, unless expressly defined herein, terms such as those defined in a general dictionary may be construed as having meanings consistent with their meanings in the related art and in the content of this application and may not be construed as idealistic or overly formal.

The following content describes exemplary embodiments with reference to the drawings. It needs to be noted that components depicted with reference to the drawings are not necessarily shown to scale; the same or similar components may be given the same or similar reference numeral representation or similar technical terminology.

Specific implementations of this application are described in further detail below with reference to the drawings.

First Embodiment

Figure 1:
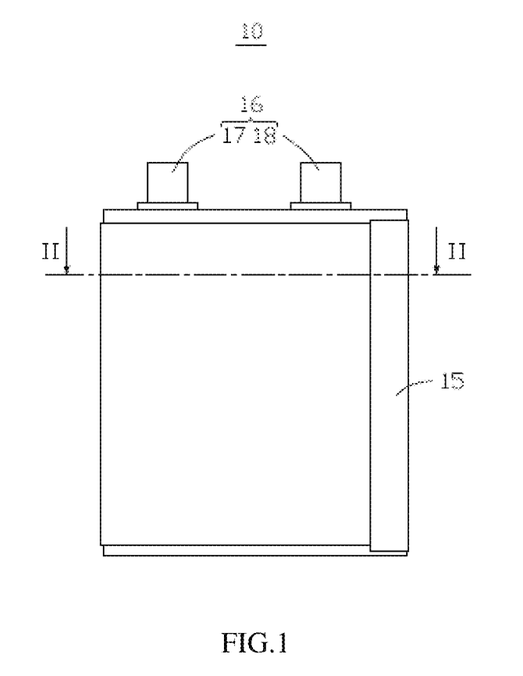
FIG. 1 is a schematic planar view of a battery cell according to a first embodiment of this application.
Figure 3:
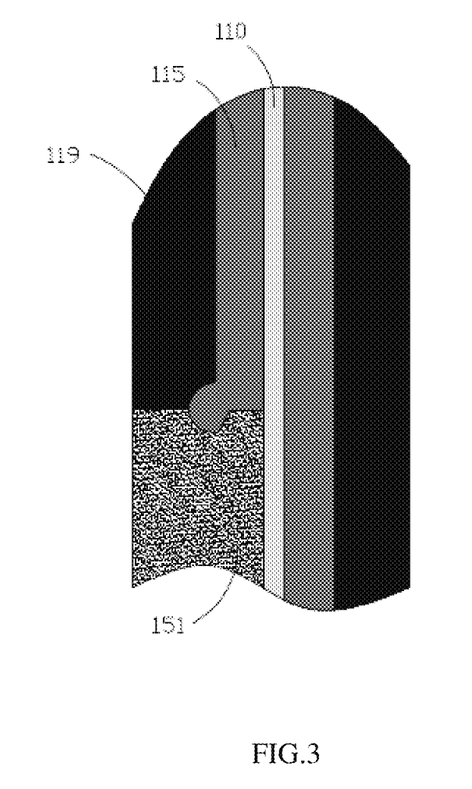
FIG. 3 is a schematic partial cross-sectional view of a first electrode plate according to the first embodiment of this application.

As shown in FIG. 1 and FIG. 3, a first embodiment of this application provides a battery cell 10. The battery cell 10 includes a first electrode plate 11, a second electrode plate 12, and a separator 13. The first electrode plate 11 and the second electrode plate 12 are wound at intervals. The separator 13 is disposed between the first electrode plate 11 and the second electrode plate 12. In one embodiment, the first electrode plate 11 and the second electrode plate 12 may be disposed by lamination. In this embodiment, the first electrode plate 11 and the second electrode plate 12 are wound, the battery cell 10 further includes a winding needle 14, the first electrode plate 11, the separator 13, and the second electrode plate 12 are sequentially disposed at intervals and wound around the winding needle 14.

The first electrode plate 11 includes a first current collector 110, a first coating 115, and a first active layer 119, the first coating 115 is disposed between the first current collector 110 and the first active layer 119, and the first coating 115 comprises a thermal expansion material. The first electrode plate 11 includes a first end 111 and a third end 113. The first end 111 and the third end 113 are located on two ends of the first electrode plate 11 respectively. In one embodiment, the first end 111 is disposed on an outer side of the battery cell 10, the third end 113 is disposed in the battery cell 10, and a surface of the first current collector 110 at the first end 111 facing toward the center of the battery cell 10 is provided with the first active layer 119. In one embodiment, the first end 111 is a winding ending end, and the third end 113 is a winding starting end.

The first coating 115 is selected from one of polyvinylidene fluoride, a copolymer of vinylidene fluoride-hexafluoropropylene, polyamide, polyacrylonitrile, polyacrylate, polyacrylic acid, sodium carboxymethyl cellulose, polyvinyl pyrollidonone, polyethylene ether, polymethyl methacrylate, polytetrafluoroethylene, polyhexafluoropropylene and styrene butadiene rubber and combinations thereof. The first coating 115 has an extremely high thermal expansion coefficient. When the battery cell 10 is short-circuited due to the contact between the first electrode plate 11 and the second electrode plate 12, a certain amount of heat is generated in a short-circuited region, and the first coating 115 is heated and rapidly expands to separate the first fluid collector 110 of the first electrode plate 11 from the second electrode plate, thus disconnecting the short-circuited region, that is, the first fluid collector 110 does not electrically contact with other elements to prevent the occurrence of severe a short circuit.

Figure 2:
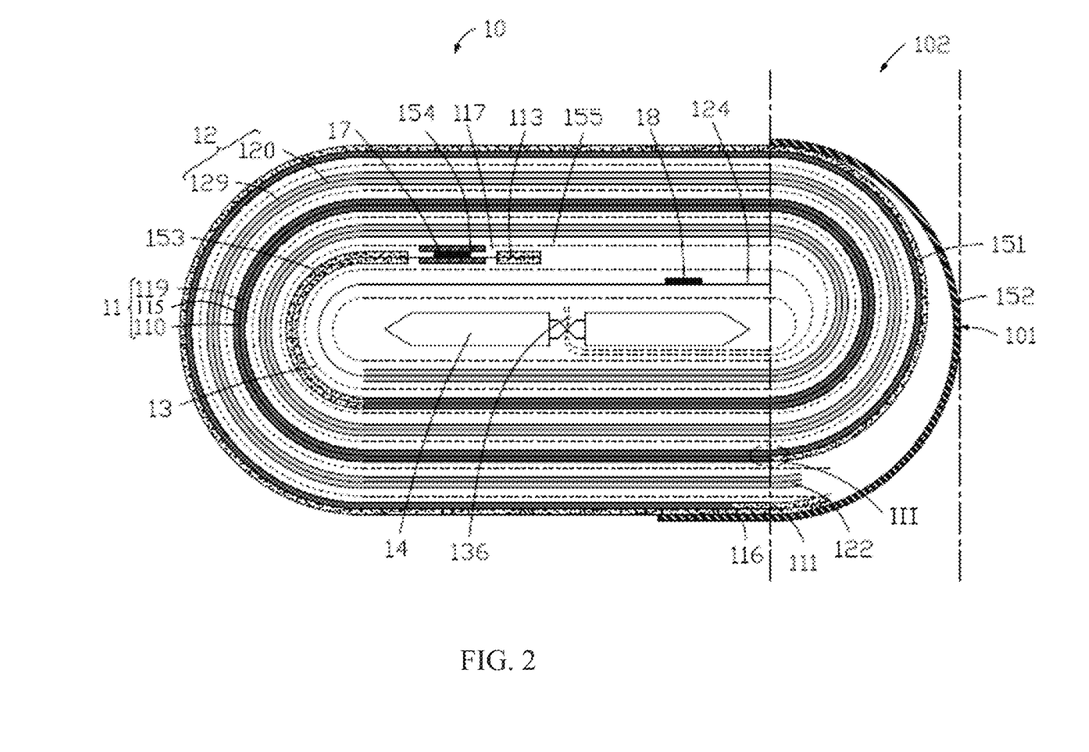
FIG. 2 is a schematic cross-sectional structural view of the battery cell according to the first embodiment of this application.

The second electrode plate 12 includes a second current collector 120 and a second active layer 129. The second active layer 129 is disposed on a surface of the second current collector 120. The second electrode plate 12 includes a second end 122 and a fourth end 124. The second end 122 and the fourth end 124 are located on two ends of the second electrode plate 12 respectively. In one embodiment, the second end 122 is disposed on an outer side of the battery cell 10, and the fourth end 124 is disposed in the battery cell 10. In one embodiment, the second end 122 is a winding ending end, and the fourth end 124 is a winding starting end.

In one embodiment, the battery cell 10 is a wound battery cell, the outermost electrode plate of the battery cell 10 is the first electrode plate 11, a surface of the first current collector 110 on the outermost electrode plate of the battery cell facing toward the center of the battery cell 10 is provided with the first active layer 119, and a surface of the first current collector 110 on the outermost electrode plate of the battery cell 10 is not provided with the first active layer 119. That is, an inner surface of the first electrode plate 11 located in the outermost ring of the battery cell 10 is provided with the first active layer 119 to make it correspond to the second active layer 129 on the second electrode plate 12. An outer surface of the first electrode plate 11 located in the outermost ring of the battery cell 10 is designed as uncovered foil without any active layer. The structure can, on the one hand, improve the energy density of the battery cell 10, and on the other hand, reduce the consumption of consumable materials and improve safety performance of the battery cell 10. The outermost ring of the battery cell 10 is the ring directly facing toward a packing bag of the battery.

The battery cell 10 includes a first end face 101, and a first arc-surface region 102 connected to the first end face 101. The first end face 101 is a surface which comprises the most protruding point of an arc-shaped side of the battery cell 10 and extends along a thickness direction of the battery cell 10. The first arc-surface region 102 is an arc-shaped surface on a side of the battery cell 10. In one embodiment, the first end 111 and the second end 122 are close to the first end face 101 and are disposed in the first arc-surface region 102.

In one embodiment, the first end 111 is disposed in the first arc-surface region 102 and a length of the first electrode plate 11 located on the first arc-surface region 102 is less than one half of an arc length of the first arc-surface region 102; the second end 122 is disposed in the first arc-surface region 102 and a length of the second electrode plate 12 located on the first arc-surface region 102 is less than one half of the arc length of the first arc-surface region 102.

The first end 111 and the second end 122 are disposed in the first arc-surface region 102, that is, ending cuttings of the first electrode plate 11 and the second electrode plate 12 of the battery cell 10 are located at an "angle R" of the battery cell 10. On the one hand, the structure can support the side of the battery cell 10 to improve the flatness and overall compression resistance of the battery cell 10. On the other hand, the first end 111 and the second end 122 that are disposed in the first arc-surface region 102 are subjected to less pressure than being disposed in other regions, burrs on cutting ends of the first electrode plate 11 and the second electrode plate 12 are less likely to pierce the separator 13, which can effectively reduce short-circuited bad points in the battery cell 10, reduce the energy consumption of self-circulation of the battery cell 10, and improve the battery performance.

In one embodiment, the first end 111 includes a top sealing region 116. The top sealing region 116 is disposed on the outermost side of the first end 111. Two opposite surfaces of the first current collector located in the top sealing region 116 are both provided with a first sub-insulating adhesive 151. A region of the first electrode plate 11 provided with the first active layer 119 corresponds to the second active layer 129. In a direction perpendicular to the first end face 101, a distance L1 from a junction between a region of the first end 111 provided with the first active layer 119 and the top sealing region 116 to the second end 122 is greater than 2 mm, and a distance L3 between the first end 111 and the second end 122 is greater than 2 mm. In one embodiment, the first electrode plate 11 is a cathode, and the second electrode plate 12 is an anode.

The separator 13 includes a fifth end 135 and a sixth end 136. The fifth end 135 and the sixth end 136 are located on two ends of the separator 13. The fifth end 135 is disposed on an outer side of the battery cell 10. The sixth end 136 is disposed in the battery cell 10 and is wound around the winding needle 14. In one embodiment, an ending of the separator 13 on the outer side of the battery cell 10 is longer than the first electrode plate 11 and the second electrode plate 12, at least two fifth ends 135 wrap one second end 122. In the direction perpendicular to the first end face 101, a distance L3 from the fifth end 135 to the second end 122 is greater than 4 mm.

The battery cell 10 further includes an insulating adhesive 15. The insulating adhesive 15 includes a first sub-insulating adhesive 151 and a second sub-insulating adhesive 152. The insulating adhesive 15 may be an organic insulating material, such as a green adhesive or a hot-melt adhesive. The first sub-insulating adhesive 151 is provided on a surface of the first current collector 110 on the outermost side of the battery cell 10 facing away from the first active layer 119, that is, an uncovered foil region of the first current collector 110 of the outermost electrode plate of the battery cell 10 without the first active layer 119 is provided with the first sub-insulating adhesive 151. The first sub-insulating adhesive 151 can effectively improve the safety of the battery cell 10 without occupying additional space. The second sub-insulating adhesive 152 covers the first end 111 and the second end 122, and the sub-insulating adhesive 152 is in contact with the first sub-insulating adhesive 151. The second sub-insulating adhesive 152 covers a part of the first sub-insulating adhesive 151 and the part is away from the first end 111. The first sub-insulating adhesive 151 and the second sub-insulating adhesive 152 are disposed on two sides of the first end 111 and the second end 122 (cutting ends of the electrode plate), so as to further prevent the burrs of the first end 111 and the second end 122 from piercing the separator 13 or the outer packing bag of the battery cell 10 to avoid a liquid leakage and a short circuit.

The battery cell 10 further includes tabs 16. The tabs 16 may include a first tab 17 and a second tab 18. The first tab 17 is electrically connected to the first electrode plate 11. Specifically, the first tab 17 is formed by extending from the first current collector 110. The second tab 18 is electrically connected to the second electrode plate 12. Specifically, the second tab 18 is formed by extending from the second current collector 120.

In one embodiment, the insulating adhesive 15 further includes a third sub-insulating adhesive 153 and a fourth sub-insulating adhesive 154, the third sub-insulating adhesive 153 is disposed on the third end 113, the third sub-insulating adhesive 153 includes a connecting region 117, and the first current collector 110 in the connecting region 117 is bare. The first tab 17 is disposed in the connecting region 117, and the fourth sub-insulating adhesive 154 is disposed on two sides of the first tab 17 of the connecting region 117 to protect the first tab 17.

Second Embodiment

Figure 4:
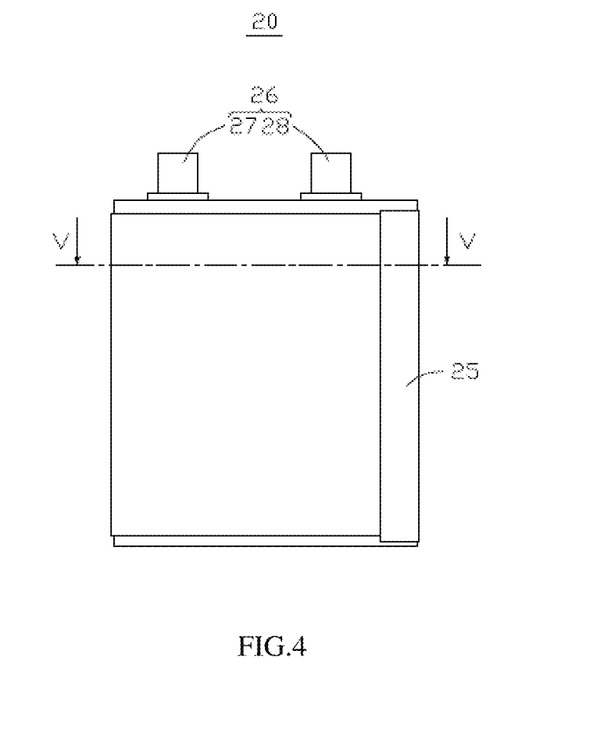
FIG. 4 is a schematic planar view of a battery cell according to a second embodiment of this application.
Figure 6:
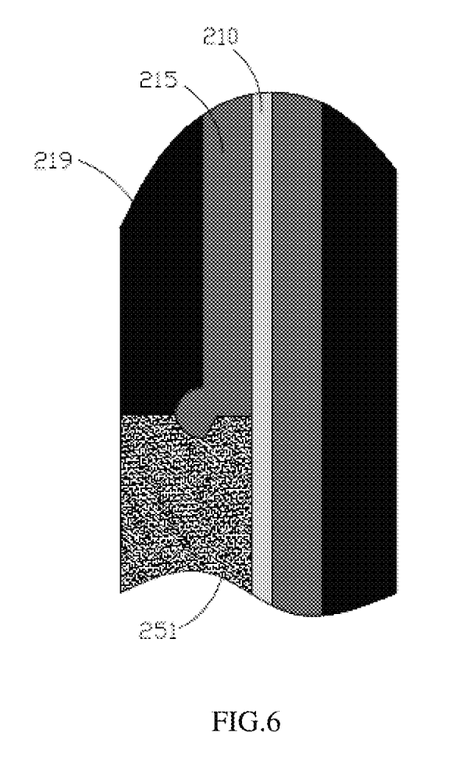
FIG. 6 is a schematic partial cross-sectional view of a first electrode plate according to the second embodiment of this application.

As shown in FIG. 4 and FIG. 6, a second embodiment of this application provides a battery cell 20. The battery cell 20 includes a first electrode plate 21, a second electrode plate 22, and a separator 23. The first electrode plate 21 and the second electrode plate 22 are wound at intervals. The separator 23 is disposed between the first electrode plate 21 and the second electrode plate 22. In one embodiment, the first electrode plate 21 and the second electrode plate 22 may be disposed by lamination. In this embodiment, the first electrode plate 21 and the second electrode plate 22 are wound, the battery cell 20 further includes a winding needle 24, the first electrode plate 21, the separator 23, and the second electrode plate 22 are sequentially disposed at intervals and wound around the winding needle 24.

The first electrode plate 21 includes a first current collector 210, a first coating 215, and a first active layer 219, the first coating 215 is disposed between the first current collector 210 and the first active layer 219, and the first coating 215 comprises a thermal expansion material. The first electrode plate 21 includes a first end 211 and a third end 213. The first end 211 and the third end 213 are located on two ends of the first electrode plate 21 respectively. In one embodiment, the first end 211 is disposed on an outer side of the battery cell 20, the third end 213 is disposed in the battery cell 20, and a surface of the first current collector 210 at the first end 211 facing toward the center the battery cell 20 is provided with the first active layer 219. In one embodiment, the first end 211 is a winding ending end, and the third end 213 is a winding starting end.

The first coating 215 is selected from one of polyvinylidene fluoride, a copolymer of vinylidene fluoride-hexafluoropropylene, polyamide, polyacrylonitrile, polyacrylate, polyacrylic acid, sodium carboxymethyl cellulose, polyvinyl pyrollidonone, polyethylene ether, polymethyl methacrylate, polytetrafluoroethylene, polyhexafluoropropylene and styrene butadiene rubber and combinations thereof. The first coating 215 has an extremely high thermal expansion coefficient. When the battery cell 20 is short-circuited due to the contact between the first electrode plate 21 and the second electrode plate 22, a certain amount of heat is generated in a short-circuited region, and the first coating 215 is heated and rapidly expands to separate the first fluid collector 210 of the first electrode plate 21 from the second electrode plate, thus disconnecting the short-circuited region, that is, the first fluid collector 210 does not electrically contact with other elements to prevent the occurrence of severe short circuit.

Figure 5:
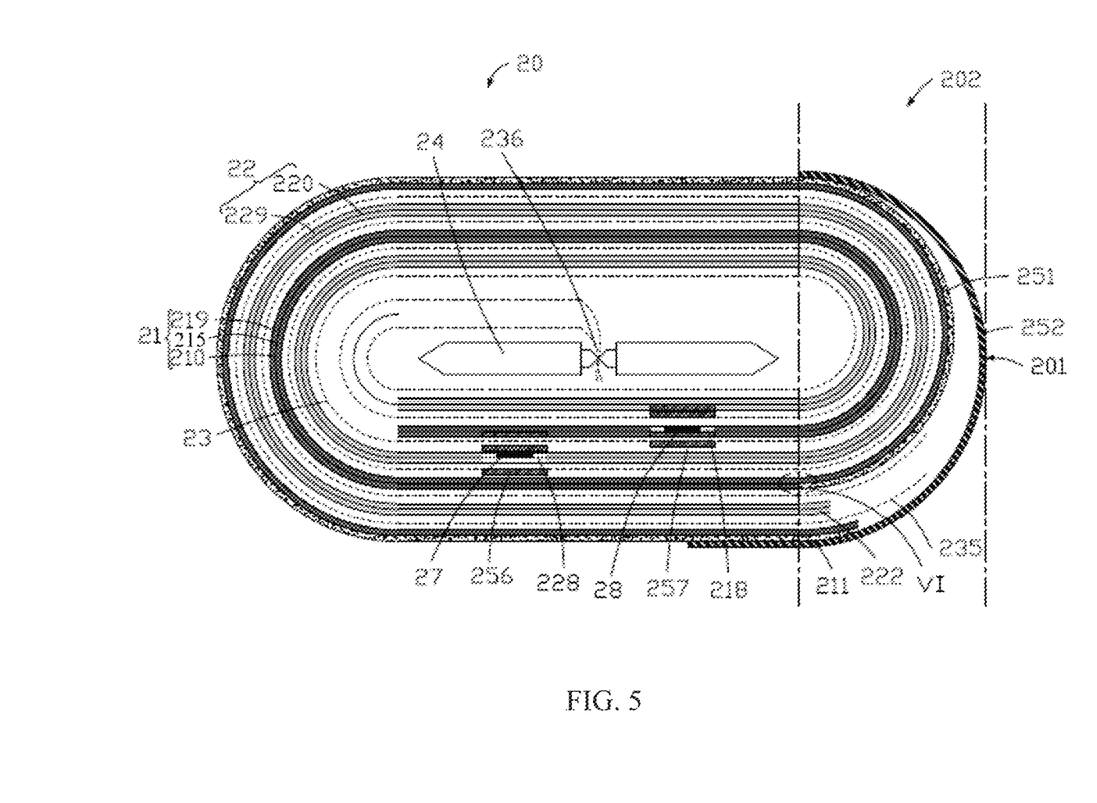
FIG. 5 is a schematic cross-sectional structural view of the battery cell according to the second embodiment of this application.

The second electrode plate 22 includes a second current collector 220 and a second active layer 229. The second active layer 229 is disposed on a surface of the second current collector 220. The second electrode plate 22 includes a second end 222 and a fourth end 224. The second end 222 and the fourth end 224 are located on two ends of the second electrode plate 22 respectively. In one embodiment, the second end 222 is disposed on an outer side of the battery cell 20, and the fourth end 224 is disposed in the battery cell 20. In one embodiment, the second end 222 is a winding ending end, and the fourth end 224 is a winding starting end.

In one embodiment, the battery cell 20 is a wound battery cell, the outermost electrode plate of the battery cell 20 is the first electrode plate 21, a surface of the first current collector 210 of the outermost electrode plate of the battery cell facing toward of the battery cell 20 is provided with the first active layer 219, and a surface of the first current collector 210 of the outermost electrode plate of the battery cell 20 is not provided with the first active layer 219. That is, an inner surface of the first electrode plate 21 located in the outermost ring of the battery cell 20 is provided with the first active layer 219 to make it correspond to the second active layer 229 on the second electrode plate 22. An outer surface of the first electrode plate 21 located in the outermost ring of the battery cell 20 is designed as uncovered foil without any active layer. The structure can, on the one hand, improve the energy density of the battery cell 20, and on the other hand, reduce the consumption of consumable materials and improve safety performance of the battery cell 20. The outermost ring of the battery cell 20 is the ring directly facing toward a packing bag of the battery.

The battery cell 20 includes a first end face 201, and a first arc-surface region 202 connected to the first end face 201. The first end face 201 is a surface which comprises the most protruding point of an arc-shaped side of the battery cell 20 and extends along a thickness direction of the battery cell 20. The first arc-surface region 202 is an arc-shaped surface on a side of the battery cell 20. In one embodiment, the first end 211 and the second end 222 are close to the first end face 201 and are disposed in the first arc-surface region 202.

In one embodiment, the first end 211 is disposed in the first arc-surface region 202 and a length of the first electrode plate 21 located on the first arc-surface region 202 is less than one half of an arc length of the first arc-surface region 202; the second end 222 is disposed in the first arc-surface region 202 and a length of the second electrode plate 22 located on the first arc-surface region 202 is less than one half of the arc length of the first arc-surface region 202.

The first end 211 and the second end 222 are disposed in the first arc-surface region 202, that is, ending cuttings of the first electrode plate 21 and the second electrode plate 22 of the battery cell 20 are located at an "angle R" of the battery cell 20. On the one hand, the structure can support the side of the battery cell 20 to improve the flatness and overall compression resistance of the battery cell 20. On the other hand, the first end 211 and the second end 222 that are disposed in the first arc-surface region 202 are subjected to less pressure than being disposed in other regions, burrs on cutting ends of the first electrode plate 21 and the second electrode plate 22 are less likely to pierce the separator 23, which can effectively reduce short- circuited bad points in the battery cell 20, reduce the energy consumption of self-circulation of the battery cell 20, and improve the battery performance.

In a direction perpendicular to the first end face 201, a distance from the first end 211 to the first end face 201 is greater than a distance from the second end 222 to the first end face 201; a distance L1 from the first end 211 to the second end 222 is greater than 2 mm. In one embodiment, the first electrode plate 21 is a cathode, and the second electrode plate 22 is an anode.

The separator 23 includes a fifth end 235 and a sixth end 236. The fifth end 235 and the sixth end 236 are located on two ends of the separator 23. The fifth end 235 is disposed on an outer side of the battery cell 20. The sixth end 236 is disposed in the battery cell 20 and is wound around the winding needle 24. In one embodiment, an ending of the separator 23 on the outer side of the battery cell 20 is longer than the first electrode plate 21 and the second electrode plate 22, at least two fifth ends 235 wrap one second end 222. In the direction perpendicular to the first end face 201, a distance L3 from the fifth end 235 to the second end 222 is greater than 4 mm.

The battery cell 20 further includes an insulating adhesive 25. The insulating adhesive 25 includes a first sub-insulating adhesive 251 and a second sub-insulating adhesive 252. The insulating adhesive 25 may be an organic insulating material, such as a green adhesive or a hot melt-adhesive. The first sub-insulating adhesive 251 is provided on a surface of the first current collector 210 on the outermost side of the battery cell 20 facing away from the first active layer 219, that is, an uncovered foil region of the first current collector 210 of the outermost electrode plate of the battery cell 20 without the first active layer 219 is provided with the first sub-insulating adhesive 251. The first sub-insulating adhesive 251 can effectively improve the safety of the battery cell 20 without occupying additional space. The second sub-insulating adhesive 252 covers the first end 211 and the second end 222, and the sub-insulating adhesive 252 is in contact with the first sub-insulating adhesive 251. The second sub-insulating adhesive 252 covers a part of the first sub-insulating adhesive 251 and the part is away from the first end 211. The first sub-insulating adhesive 251 and the second sub-insulating adhesive 252 are disposed on two sides of the first end 211 and the second end 222 (cutting ends of the electrode plate), so as to further prevent the burrs of the first end 211 and the second end 222 from piercing the separator 23 or the outer packing bag of the battery cell 20 to avoid a liquid leakage and a short circuit.

The battery cell 20 further includes tabs 26. The tabs 26 may include a first tab 27 and a second tab 28. The first tab 27 is electrically connected to the first electrode plate 21. Specifically, the first tab 27 is formed by extension of the first current collector 210. The second tab 28 is electrically connected to the second electrode plate 22. Specifically, the second tab 28 is formed by extending from the second current collector 220.

In one embodiment, the first electrode plate 21 includes a first uncovered foil region 218, and the second electrode plate 22 includes a second uncovered foil region 228. The first current collector 210 located in the first uncovered foil region 218 is not covered by the first active layer 219, and the first uncovered foil region 218 is located in an inner ring of the battery cell 20. The second current collector 220 located in the second uncovered foil region 228 is not covered by the second active layer 229, and the second uncovered foil region 228 is located in the inner ring of the battery cell 20.

The insulating adhesive 25 further includes a sixth sub-insulating adhesive 256 and a seventh sub-insulating adhesive 257. The first tab 27 is disposed in the first uncovered foil region 218, and the sixth sub-insulating adhesive 256 is symmetrically disposed on two sides of the first tab 27. The second tab 28 is disposed in the second uncovered foil region 228, and the seventh sub-insulating adhesive 257 is symmetrically disposed on two sides of the second lug 28.

Third Embodiment

Figure 7:
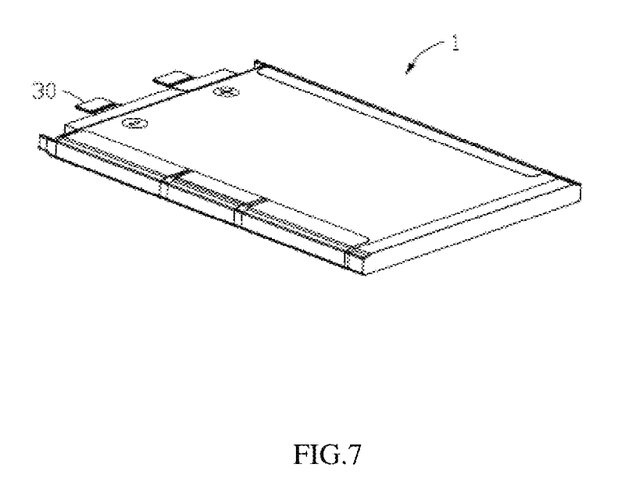
FIG. 7 is a schematic planar view of a battery according to a third embodiment of this application.

As shown in FIG. 7, it is a schematic planar view of a battery 1 according to a third embodiment of this application. The battery 1 includes a packing bag and a battery cell 30 wrapped by the packing bag. The battery cell 30 may be the battery cell described in any one of the first embodiment and the second embodiment.

Fourth Embodiment

Figure 8:
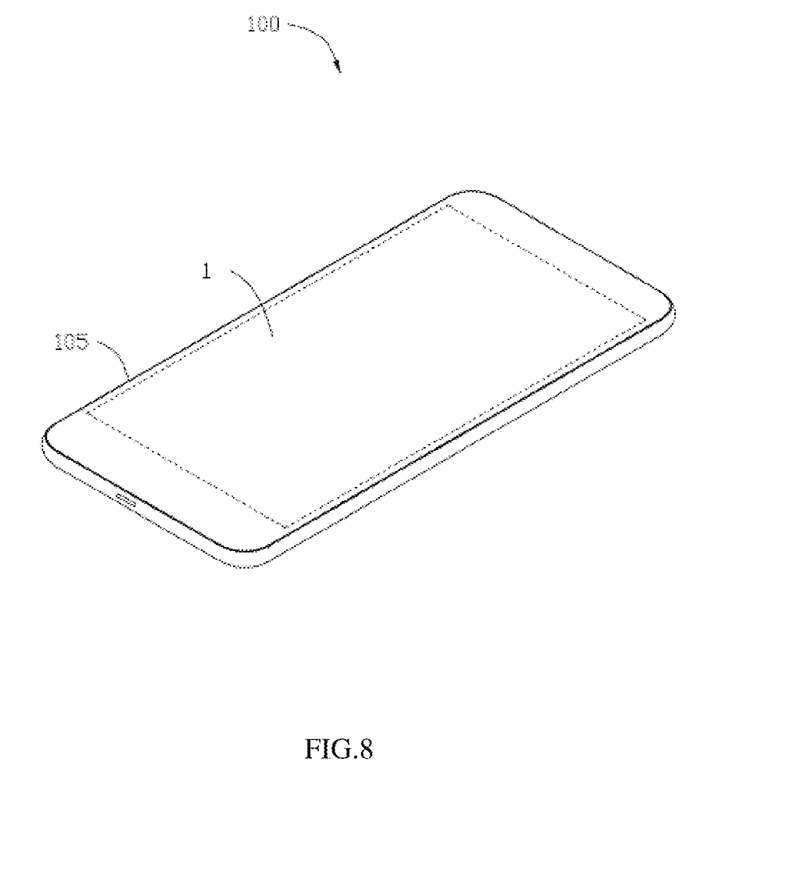
FIG. 8 is a schematic perspective view of an electronic device according to a fourth embodiment of this application.

As shown in FIG. 8, it is a schematic perspective view of an electronic device 100 according to a fourth embodiment of this application.

This application further provides an electronic device 100. The electronic device includes a body 105 and a battery 1 disposed in the body 105. The battery 1 includes the battery cell described in the first embodiment or the second embodiment.

The electronic device 100 being a mobile phone is only taken as an example in FIG. 8. In other embodiments, the electronic device 100 may also be a wearable device, an unmanned aerial vehicle, a personal computer, an intelligent home appliance, an industrial controller, an energy storage device, a power tool, an electric vehicle, or the like.

Specific implementations of this application are described above with reference to the drawings. However, those of ordinary skill in the art can understand that various changes and substitutions may also be made to the spirit and scope of this application. All such changes and substitutions fall within the scope defined by this application.

The invention claimed is:
1. A battery cell, comprising:
a first electrode plate comprising a first current collector, a first coating, and a first active layer; wherein the first coating is disposed between the first current collector and the first active layer and comprises a thermal expansion material;
a second electrode plate, wherein the first electrode plate and the second electrode plate are wound at intervals, an outermost electrode plate of the battery cell is provided as the first electrode plate, the first electrode plate further comprises a first end, the first end is a winding ending end, and a surface of the first current collector at the first end facing toward the center of the battery cell is provided with the first active layer; and an insulating adhesive, wherein the insulating adhesive comprises a first sub-insulating adhesive, wherein an entire surface of the first current collector, on the outermost side of the battery cell facing away from the first active layer, is directly covered by the first sub-insulating adhesive;

wherein the insulating adhesive further comprises a second sub-insulating adhesive, the second sub-insulating adhesive covers an outer surface of the first end facing away from the first active layer, and the second sub-insulating adhesive is in contact with the first sub-insulating adhesive and directly covers an outer surface of a part of the first sub-insulating adhesive facing away from the first current collector;

wherein the first sub-insulating adhesive and the second sub-insulating adhesive are made of identical material.

2. The battery cell according to claim 1, wherein the first coating is selected from the group consisting of polyvinylidene fluoride, a copolymer of vinylidene fluoride-hexafluoropropylene, polyamide, polyacrylonitrile, polyacrylate, polyacrylic acid, sodium carboxymethyl cellulose, polyvinyl pyrollidonone, polyethylene ether, polymethyl methacrylate, polytetrafluoroethylene, polyhexafluoropropylene and styrene butadiene rubber and combinations thereof.

3. The battery cell according to claim 1, wherein,
the second electrode plate comprises a second current collector, a second active layer, and a second end, and
the battery cell further comprises a first end face and a first arc-surface region connected to the first end face, the first end is disposed in the first arc-surface region and a length of the first electrode plate located on the first arc-surface region is less than one half of an arc length of the first arc-surface region, the second end is disposed in the first arc-surface region and a length of the second electrode plate located on the first arc-surface region is less than one half of the arc length of the first arc-surface region, a surface of the second current collector located at the second end is provided with the second active layer, and a distance from the first end to the first end face is greater than a distance from the second end to the first end face.

4. The battery cell according to claim 3, wherein the second sub-insulating adhesive covers the second end.

5. The battery cell according to claim 3, wherein,
the battery cell further comprises a separator disposed between the first electrode plate and the second electrode plate, and
a distance from one end of the separator to the first end face is less than the distance from the second end to the first end face.

6. The battery cell according to claim 3, wherein,
the first electrode plate further comprises a third end,
the second electrode plate further comprises a fourth end, the third end and the fourth end are winding starting ends, and
the battery cell further comprises tabs disposed at the third end and the fourth end.

7. The battery cell according to claim 6, wherein,
a surface of the first current collector located at the third end is not provided with the first active layer,
a surface located at the fourth end is not provided with the second active layer, and
the insulating adhesive further comprises a third sub-insulating adhesive and a fourth sub-insulating adhesive, the surface of the first current collector located at the third end is provided with the third sub-insulating adhesive, the third sub-insulating adhesive is provided with a connecting region, each tab disposed at the third end is at least partially disposed in the connecting region, and the fourth sub-insulating adhesive is symmetrically disposed on two sides of the connecting region.

8. The battery cell according to claim 3, wherein,
the battery cell further comprises tabs,
the first electrode plate comprises a first uncovered foil region,
the second electrode plate comprises a second uncovered foil region,
the first current collector located in the first uncovered foil region is not covered by the first active layer,
the second current collector located in the second uncovered foil region is not covered by the second active layer, and
the tabs are disposed in the first uncovered foil region and the second uncovered foil region.

9. The battery cell according to claim 1, wherein the second sub-insulating adhesive partially covers the outer surface of the first sub-insulating adhesive facing away from the first current collector, the second sub-insulating adhesive consists of a body portion that entirely covers a first arc-surface region of the battery and an end portion that extends beyond the first arc-surface region and overlaps the first end, wherein the first arc-surface region of the battery is an arc-shaped surface on a side of the battery cell.

10. A battery, comprising the battery cell according to claim 1.

11. An electronic device, comprising the battery according to claim 10.

* * * * *